United States Patent [19]
Collar et al.

[11] Patent Number: 5,189,411
[45] Date of Patent: Feb. 23, 1993

[54] RADIO SIGNAL DATA TRANSMISSION SYNCHRONIZATION

[75] Inventors: James K. Collar, Portland; Garold B. Gaskill, Tualatin; Daniel J. Park, Portland; Carl D. Shanks; Rick T. Wells, both of Aloha, all of Oreg.

[73] Assignees: Seiko Corp.; Seiko Epson Corp., both of Japan

[21] Appl. No.: 595,145

[22] Filed: Oct. 10, 1990

Related U.S. Application Data

[60] Continuation-in-part of Ser. No. 553,700, Jul. 17, 1990, abandoned, which is a continuation of Ser. No. 326,491, Mar. 17, 1989, abandoned, which is a continuation of Ser. No. 101,252, Sep. 25, 1987, abandoned, which is a division of Ser. No. 802,844, Nov. 27, 1985, Pat. No. 4,713,808.

[51] Int. Cl.⁵ .............................................. H04J 3/00
[52] U.S. Cl. .............................. 340/825.14; 340/825.2; 370/100.1; 370/102
[58] Field of Search ........... 340/825.14, 825.2, 825.44; 370/94.1, 100.1, 101, 102; 375/107, 112

[56] References Cited

U.S. PATENT DOCUMENTS

| | | | |
|---|---|---|---|
| 3,873,773 | 3/1975 | Guy, Jr. | 370/102 |
| 4,158,107 | 6/1979 | Nicholas | 370/102 |
| 4,454,508 | 6/1984 | Grow | 340/825.2 |
| 4,688,215 | 8/1987 | Fryer | 370/102 |
| 4,897,835 | 1/1990 | Gaskill et al. | 370/94.1 |
| 4,945,548 | 7/1990 | Iannarone et al. | 370/102 |

Primary Examiner—Donald J. Yusko
Assistant Examiner—Peter Weissman
Attorney, Agent, or Firm—Elmer Galbi

[57] ABSTRACT

Real time synchronization of radio signal data is achieved by a feedback loop between a clearinghouse generating data and a radio station transmitting data. Transmission time is adjusted in response to detected timing errors by selectively inserting padding data between certain data packets to shift data packet position within a data stream transmitted at a predetermined transmission rate. Data flow control is achieved by use of variable length flags delimiting data packets whereby longer flags result in less data flow and shorter flags result in greater data flow.

16 Claims, 7 Drawing Sheets

5,189,411

RADIO SIGNAL DATA TRANSMISSION SYNCHRONIZATION

CROSS-REFERENCE TO RELATED APPLICATIONS

The present application is a continuation-in-part of application Ser. No. 07/553,700 filed Jul. 17, 1990 and now abandoned, which is a continuation of application Ser. No. 07/326,491 filed Mar. 17, 1989 and now abandoned, which is a File Wrapper continuation of application Ser. No. 07/101,252 filed Sep. 25, 1987 and now abandoned, which is a divisional of application Ser. No. 06/802,844 filed Nov. 27, 1985 and issued as U.S. Pat. No. 4,713,808 on Dec. 15, 1987.

The present invention relates to radio signal data transmission and particularly to transmission of time critical data in a synchronous communication system.

The present application relates to application Ser. No. 07/595,146 filed Oct. 10, 1990 titled METHOD OF DATA FLOW CONTROL, filed concurrently herewith and commonly owned by the assignee of the present application.

BACKGROUND OF THE INVENTION

Providing information by radio transmission includes the steps of data generation and data transmission. The process of data transmission is typically separate from the process of data generation. When physically separate, a communication link delivers information from the data generating installation to the data transmission installation. In the case of time synchronous data, as provided in a time synchronous communication protocol, a predetermined transmission rate and a precise time of transmission is required. It is necessary, therefore, to provide real time synchronization of transmitted data to maintain proper system operation.

Flow control for time critical data presents additional system requirements. The data generating installation must provide a flow of data to the transmission installation at least as great as the transmission rate. If the data flow is insufficient, i.e. in the event of underflow, the transmission facility lacks data to transmit and fails to maintain system protocol. Providing an overflow of data, i.e., buffering large volumes of data at the transmission facility, is not desirable when system protocol calls for transmission as soon as possible following data generation.

SUMMARY OF THE INVENTION

Real time synchronization of radio signal data is achieved in accordance with the present invention by a feedback loop between a clearinghouse generating data and a radio station transmitting data. Transmission time is adjusted in response to detected timing errors by selectively inserting padding data between certain data packets to shift data packet position within a data stream transmitted at a predetermined transmission rate. To delay subsequent data packet transmissions, additional padding data is inserted, and to advance transmission time, padding data is removed. Actual time of transmission is calculated without a time reference at the radio station by detecting a known volume of data in a return verification data path.

DETAILED DESCRIPTION

The present invention finds application in synchronous communication systems and will be illustrated in the context of a time division multiplexed radio signal communication protocol described in U. S. Pat. No. 4,713,808 issued to Gaskill et al on Dec. 15, 1987, and U. S. Pat. No. 4,897,835 issued to Gaskill et al on Jan. 30, 1990, the disclosures of which are incorporated herein by reference.

In accordance with this protocol, remote receivers activate during predetermined associated time slots to receive packets of transmitted paging information with each packet corresponding to a time slot of the protocol. Paging information for a particular receiver must be transmitted only during an associated time slot if it is to be received by the intended receiver The paging information provided is synchronous, i.e., transmitted on a time critical basis. The protocol allows a certain margin of error whereby each packet may be transmitted within a given time interval, closely surrounding the targeted time slot, but this margin of error is small compared to the time interval required to transmit the data packets The subject invention synchronizes real time data packet transmission within an allowed margin of error using a feedback loop between the clearinghouse and the radio station. By determining a time of transmission for certain data packets taken as transmission time sample points, a timing error is calculated by comparing the time of transmission with an expected time of transmission. The time of transmission for subsequent data packets is adjusted dynamically to maintain alignment of data packets with their associated time slots.

Figure 1:
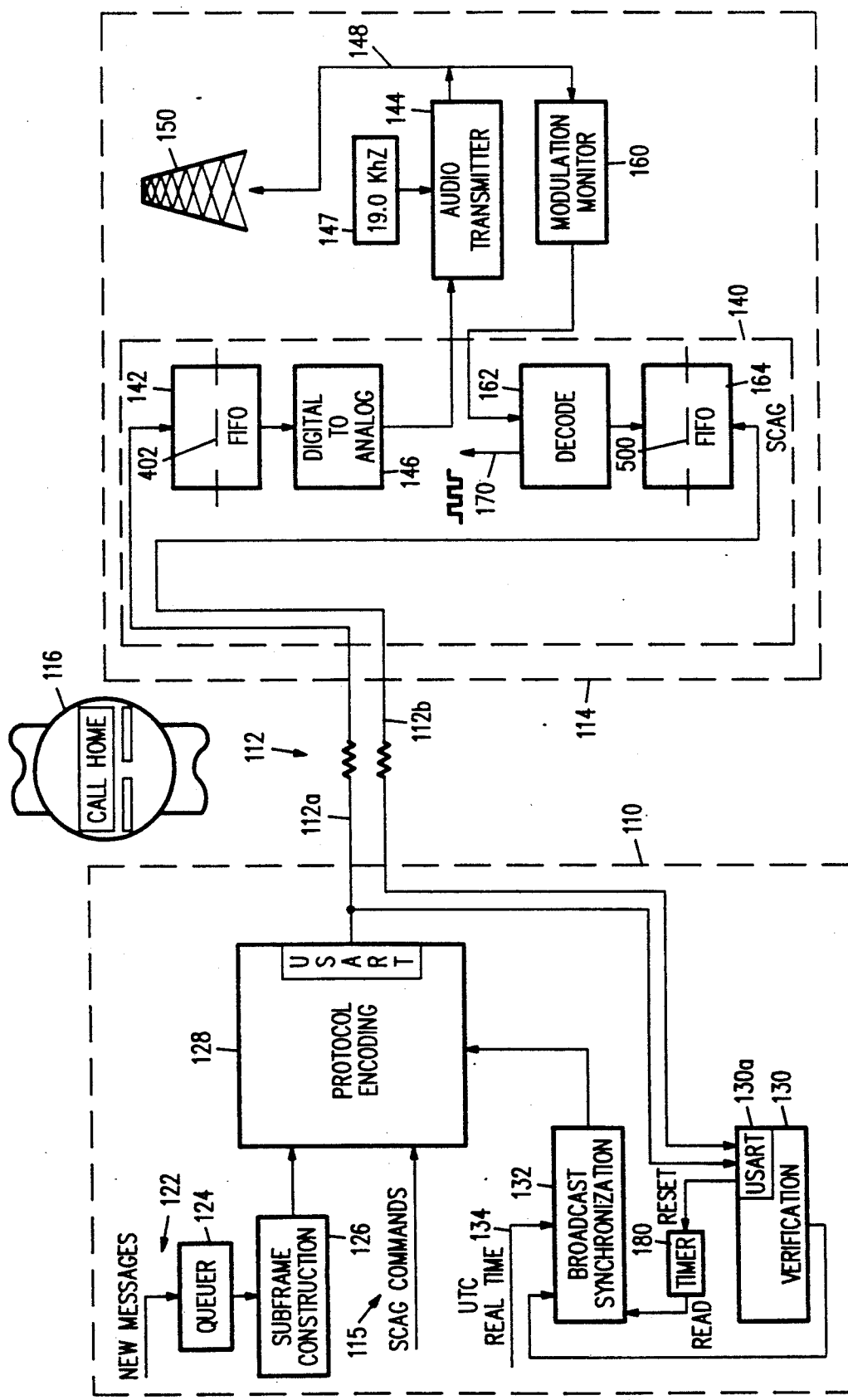
FIG. 1 illustrates, in accordance with the present invention, a clearinghouse for generating transmission data, a radio station for transmitting data, and a remote receiver to which the transmission is directed.

In FIG. 1, a clearinghouse 110 performs a data generating process by collecting new messages and preparing those messages for transmission in accordance with system protocol. A full duplex serial communication link 112 couples clearinghouse 110 and a radio station 114. Link 112 may be provided by high speed modems (not shown) interconnected by dedicated analog or digital telephone circuits, digital DDS circuits, or microwave links. Clearinghouse 110 provides to radio station 114 the collected and encoded paging messages for transmission, and additional SCAG commands 115 for remote operation of a subcarrier generator (SCAG) 140 of radio station 114. Radio station 114 processes and transmits the paging messages at a predetermined transmission rate. A remote receiver 116 monitors the transmission provided by radio station 114 during its assigned time slots to receive paging messages. Radio station 114 also monitors the signal it generates for transmission and collects verification data. The verification data is then returned to clearinghouse 110 along communication link 112. Clearinghouse 110 uses the verification data to confirm both the content of messages transmitted and, as explained more fully below, the time of message transmission.

It should be understood that SCAG 140 and clearinghouse 110 are computer based devices operating under program control and that their depiction herein illustrates data flow and synchronization as it pertains to the present invention, and not all hardware details.

Figure 2:
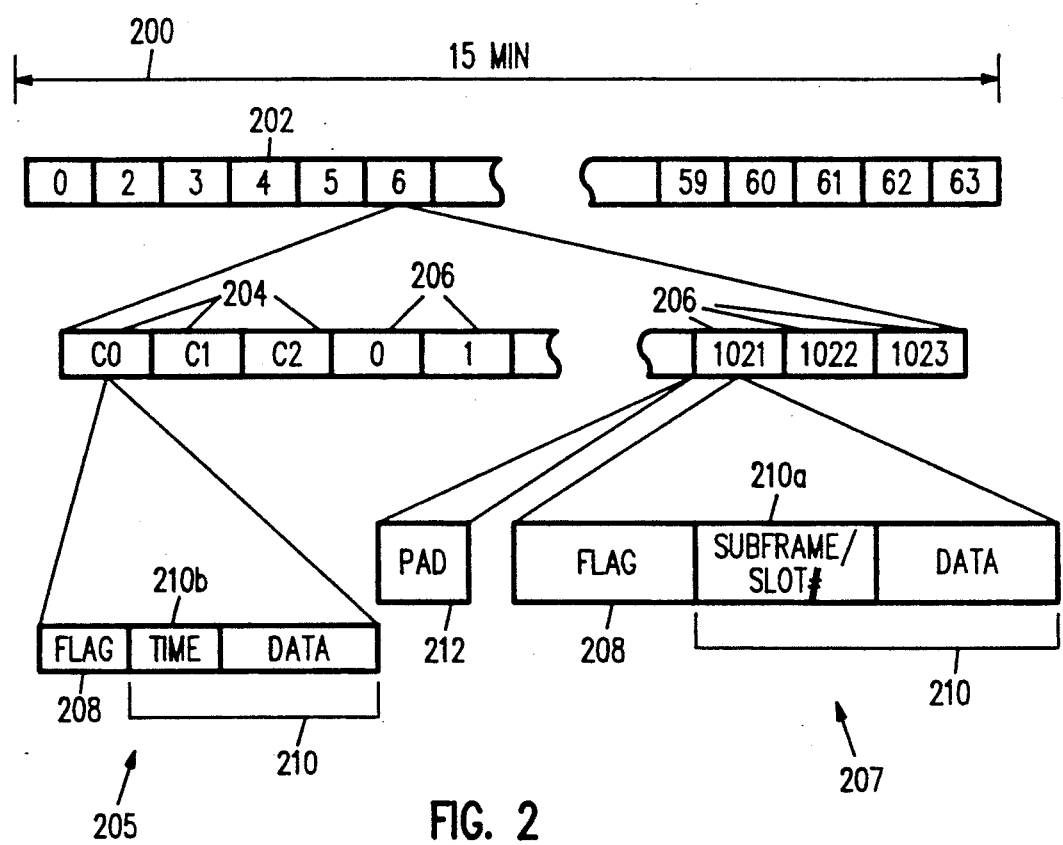
FIG. 2 illustrates a synchronous transmission protocol including a cyclic master time frame divided into subframes and time slots with padding bits selectively inserted between selected data packets for alignment with the associated time slots.

FIG. 2 illustrates a synchronous transmission protocol including the formatting and timing of data transmissions to the receivers 116. The illustrated paging system is a time division multiplexing system providing data packet transmissions with reference to a cyclic fifteen minute master time frame 200. Each master time frame 200 is divided into sixty-four subframes 202 numbered 0 to 63. Each subframe 202 contains three control time slots 204, numbered C0 to C2, and 1024 message time slots 206, numbered 0 to 1023. Time slots 204 and 206 are of equal duration and the packets 205 and 207 transmitted during slots 204 and 206, respectfully, are similarly formatted. The data packets 205 transmitted during control time slots 204 are reserved for system information such as lists of scanning frequencies and time of day information. A paging message data packet 207 is transmitted during each message time slot 206 and carries information directed to selected receivers 116.

Packets 205 and 207 may be encoded and formatted in many ways, however, with respect to the present invention, the packets 205 and 207 are time critical data which must be broadcast during the proper time slot. As used herein, a time slot is a period of time determined by a subframe and slot number, and a station offset in a multiple radio station 114 system, referenced to universal coordinated time (UTC) Each packet 205 and 207 contains a leading 20 bit flag 208 for separating packets and a 240 bit data field 210. Data field 210 of packets 207 includes a subframe/slot number field 210a specifying position within master frame 200. The subframe/slot number field 210a of a given paging message data packet 207, therefore, indicates precisely an expected time of transmission. During control time slot C0, time of day and date information is transmitted in field 210b of data field 210. It will be understood that the degree of accuracy of time data provided during control time slot C0 is sufficient to locate the control time slot C1 within the master frame 200. The actual time of transmission of control time slot C0 is particularly critical as each receiver 116 uses this information to set its time display and to synchronize to the master time frame 200.

The set of paging message data packets 207 and control slot packets 205 corresponding a complete master frame 200 do not quite fill the required fifteen minute interval. Packets 205 and 207 each carry 260 bits of information. The total number of packets 205 and 207 transmitted in one master frame 200 (64*1027) times the number of bits in each packet (260), divided by the transmission rate 19,000 (bits/sec), and divided by 60 (sec/min) yields the number of minutes, slightly less than fifteen, required to transmit the paging data of one master time frame 200. In accordance with the present invention, padding data 212 is selectively inserted between ones of packets 205 and 207. The value of padding data 212 is immaterial, its function is to hold a place in time. Changing the amount and distribution of padding data 212, relative to this a base insertion rate, within a time frame 200 in response to detected timing errors, affects the transmission time of subsequent packets 205 and 207 and maintains real time requirements, i.e. accuracy relative to UTC.

Calculation of a base insertion rate for padding data 212 is a function of the radio station 114 transmission rate. The actual transmission rate is stable between 19,002 bps and 18,998, but can vary during operation. If a transmission rate of 19,000 is assumed in calculating a base insertion rate, transmission timing errors result and the system must correct these timing errors as part of the feedback synchronization process. It is desirable, therefore, to provide at least the stable transmission rate as a base insertion rate calculation parameter. A more accurate base insertion rate is obtained and the feedback synchronization process is not unduly burdened. Variation in the actual transmission rate during operation is then handled dynamically according to the herein described feedback synchronization process.

The system transmission rate, TRATE, determines the total number of bits, TBITS, transmitted during a master time frame 200 interval. In the illustrated system, having a 900 second master time frame, TBITS is calculated as:

$$TBITS = (TRATE*900)$$

However, the total number of bits to be transmitted according to system protocol, PBITS, is a function of the number of packets 205 and 207 corresponding to one master time frame 200 and the number of bits in each packet. Thus, in the illustrated system, PBITS is calculated as:

$$PBITS = 1,027*64*260 = 17,089,280$$

The number of padding data 212 "fill bits", FBITS, needed to fill the master time frame to a full fifteen minutes is:

$$FBITS = TBITS - PBITS$$

or $$FBITS = (TRATE*900) - 17,089,280$$

To determine on a packet by packet basis whether a padding data 212 fill bit is needed, the base insertion rate, FILL RATE, can be expressed as the number fill bits needed for each packet as follows:

$$FILL\ RATE = (TRATE*900) - 17,089,280)/65,728$$

The following algorithm FILL_BIT uses FILL RATE to determine on a packet by packet basis whether a padding data 212 fill bit is needed:

```
FILL_BIT
  BEGIN
    FILL_COUNT = FILL_COUNT + FILL_RATE
    IF FILL_COUNT > 1
    THEN
      BEGIN
        FILL_COUNT = FILL_COUNT − 1
```

```
            -continued
                RETURN TRUE
            END
        ELSE
                RETURN FALSE
    END
``` where the variable FILL_COUNT is global and incremented once for every packet 205 and 207.

In operation a padding data 212 fill bit is nominally inserted for every six packets 205 and 207, and occasionally every seven packets 205 and 207. The algorithm is essentially a packet counter returning a true or false value depending on whether or not a padding data 212 fill bit is needed adjacent a given packet 205 or 207 in order to fill the master time frame 200 to the required fifteen minutes. As described more fully hereafter, some such padding data 212 fill bits may be removed, or additional padding data 212 bits may be added, to correct a detected timing error.

Returning to FIG. 1, clearinghouse 110 receives new messages 122 through telephone interaction with calling users, or from other clearinghouses of a clearinghouse network (not shown). Each new message 122 includes addressing information identifying one of receivers 116. Because each of receivers 116 is associated with certain message time slots 206, the addressing information of each new message associates that message with the time slots 206 during which that message can be broadcast. A QUEUER function 124 of clearinghouse 110 maintains a data structure associating new messages with their assigned time slots 206. A SUBFRAME CONSTRUCTION function 126 of clearinghouse 110 builds a subframe 202 by collecting from QUEUER function 124 available new messages and incorporating system information to be transmitted during control slots 204. The time of day information placed in control slot C0 and the subframe and slot numbers placed in message data packets 207 of the newly constructed subframe 202 correspond to their expected time of transmission. A PROTOCOL ENCODING function 128 transforms the message packets, e.g., inserts error correction and detection codes, as necessary in accordance with system protocol. PROTOCOL ENCODING function 128 provides ready for transmission the 240 bit data field 210 of paging packets 205 and 207. The twenty bit flag 208, required to complete each packet 205 and 207, is provided at the time of transmission by radio station 114.

Data sent to radio station 114 by clearinghouse 110 is returned along communication link 112 as verification data. A VERIFICATION function 130 of clearinghouse 110 monitors communication link 112 to collect information sent to radio station 114 and accepts verification data returned by radio station 114. The verification data is compared to the data sent to radio station 114 to detect transmission errors. Additional verification data information, originating from radio station 114 and detected by VERIFICATION function 130, indicates a time of transmission for certain data packets taken as transmission time sample points. As discussed more fully below, the indicated time of transmission originating from radio station 114 is not a time stamp, and therefore radio station 114 need not include a real time reference exactly matching that of clearinghouse 110.

A BROADCAST SYNCHRONIZATION function 132 of clearinghouse 110 receives a real time reference 134 for detecting a timing error relative to the indicated time of transmission information provided by VERIFICATION function 130. Any transmission timing errors detected by BROADCAST SYNCHRONIZATION function 132 result in adjustment, i.e., increase or decrease the amount of padding data 212 so as to correct the timing error.

Radio station 114 includes a subcarrier generator (SCAG) 140 in communication with clearinghouse 110 by way of link 112. SCAG 140 receives the incoming message data within an input FIFO buffer 142. SCAG 140 removes message data from FIFO buffer 142 at a predetermined data transmission rate, passing the message data to the radio station 114 main transmitter 144 by way of DIGITAL-TO-ANALOG (D/A) function 146. Main transmitter 144 incorporates the output of D/A function 146 as a subcarrier signal accompanying its normal audio signal transmission. The main transmitter 144 of radio station 114 also receives a 19 kHz reference 147 as a source for a 19 kHz pilot tone provided within its signal 148 delivered to antenna 150. Signal 148 is transmitted by antenna 150 for reception by receivers 116.

SCAG 140 also inserts the twenty bit flags 208, used to delimit packets 205 and 207 as transmitted. More particularly to delimit the fields 210 of packets 205 and 207. SCAG 140 also inserts padding data 212 as instructed by clearinghouse 110 to maintain UTC time synchronization of packets 205 and 207.

Figure 3:
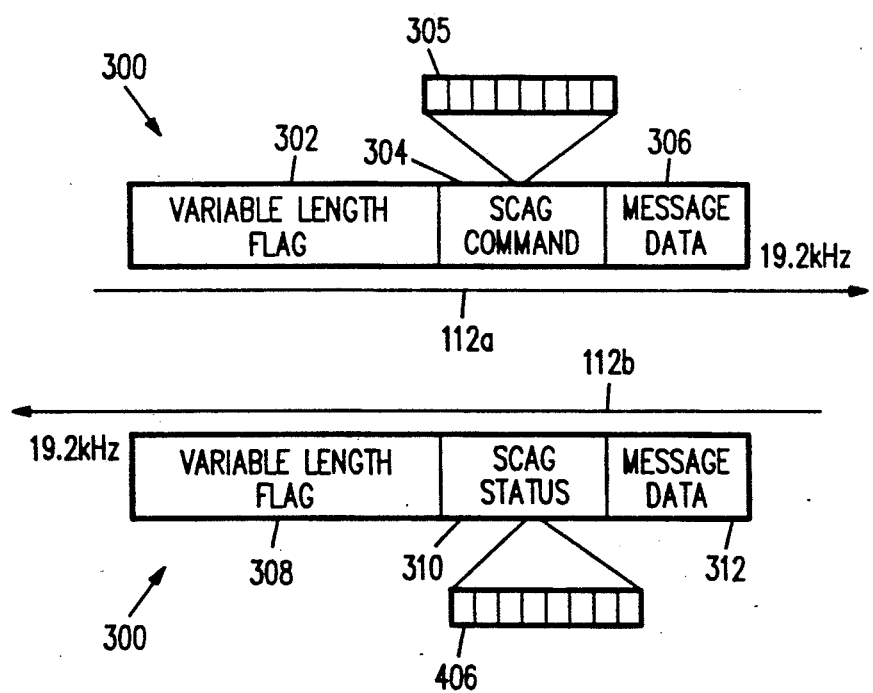
FIG. 3 illustrates data formatting on a communication link coupling the clearinghouse and radio station of FIG. 1.

With reference to FIGS. 1 and 3, as for insertion of padding data 212 at radio station 114, each packet 205 and 207 is associated with a SCAG command byte 304 as transferred in packets 300 along communication link 212. The most significant bit 305 of the SCAG command byte 304 is reserved for instruction as to insertion of padding data 212. If bit 305 of SCAG command byte 304 is set true, then SCAG 140 inserts a single bit as padding data 212 transmitted adjacent the associated packet 205 or 207. If bit 305 is false, no padding data 212 is inserted. Thus, SCAG 140 simply inserts padding data 212 as instructed by clearinghouse 110 by way of SCAG command byte 304. Clearinghouse 110 is responsible for management of the padding data 212 insertion rate.

A modulation monitor 160 of radio station 114 receives signal 148 as provided to antenna 150 and extracts the audio portion, i.e., left plus right, 19 kHz pilot tone, and left minus right, and subcarrier portion of signal 148. A DECODE function 162 of SCAG 140, substantially identical to that used in receivers 116, collects fields 210 of packets 205 and 207 from the extracted subcarrier signal provided by modulation monitor 160. The collected message data is placed in an output FIFO buffer 164 and eventually returned on link 112 as fields 312 of packets 300.

DECODE function 162 also extracts from modulation monitor 160 the 19 kHz pilot tone, as available within the signal 148, to provide a digital 19 kHz transmission rate clock 170 as a timing reference for SCAG 140. Clock 170 provides a time base for moving data from buffer 142 to D/A function 146 and, therefore, establishes the nominally 19,000 bps data transmission rate for the system.

FIG. 3 illustrates data formatting and transfer rate on communication link 112. On the uplink leg 112a of link 112, each packet 300 includes a variable length flag 302, a SCAG command byte 304, and a message data field 306 comprising the 240 bit data field 210 for broadcast in a packet 205 or 207. On the down link leg 112b of link 112, each packet 300 includes a variable length flag 308, a SCAG status byte 310, and verification field 312 representing field 210 of a transmitted packet 205 and 207. In the illustrated embodiment, communication link 112 must operate at a faster data transfer rate than the system data transmission rate of 19,000 bps. In the illustrated embodiment, communication link 112 moves data at 19,200 bps to insure that data moves to radio station 114 faster than it is transmitted, to avoid a lapse of paging message transmissions, and to accommodate the additional data it carries, e.g., SCAG command bytes 304, SCAG status bytes 310, flags 302, and flags 308.

It may be appreciated that, because communication link 112 carries SCAG commands and status information, continuous data flow on communication link 112 is desirable. Also, it is desirable to transmit message data packets as soon as possible after a subframe is constructed at clearinghouse 110, so buffering large volumes of message data fields 306 at radio station 114 is undesirable. Data flow management as described herein permits constant flow of SCAG command and status information, allowing continuous control and monitoring of the radio station SCAG 140, while buffering only small amounts of message data fields 306, allowing transmission of paging messages as soon as possible following construction at the clearinghouse 110.

Management of data flow from clearinghouse 110 to radio station 114 is accomplished by selectively modifying the length of flags 302 on the uplink leg 112a of communication link 112. Thus, flags 302 serve a dual purpose, to separate packets 300 traveling on link 112 and to increase o decrease the effective transfer rate of packets 205 and 207 as provided in message data fields 306 of packets 300. In the illustrated embodiment, flags 302 may be either short, one byte, or long, two bytes. To slow down the effective transfer rate of message data, use of long flags 302 results in less message data, i.e., message data fields 306, delivered to radio station 114. To increase the effective transfer rate of message data fields 306, use of short flags 302 results in more message data arriving at radio station 114.

The system is configured such that if all flags 302 were short, then the effective transfer rate of message packet fields 306 would be less than their transmission rate, taking into account the 20 bit fields 208 added by SCAG 140, whereby FIFO buffer 142 of radio station 114 can empty to correct a potential overflow condition. Similarly, if all flags 302 were long, the effective transfer rate of message packet fields 306 should be greater than their transmission rate so as to fill FIFO buffer 142 to correct a potential underflow condition. By dynamically selecting use of long flags 302 and short flags 302, the average effective transfer rate of message data will substantially equal its transmission rate such that overflow and underflow of FIFO buffer 142 is avoided.

Figure 4A:
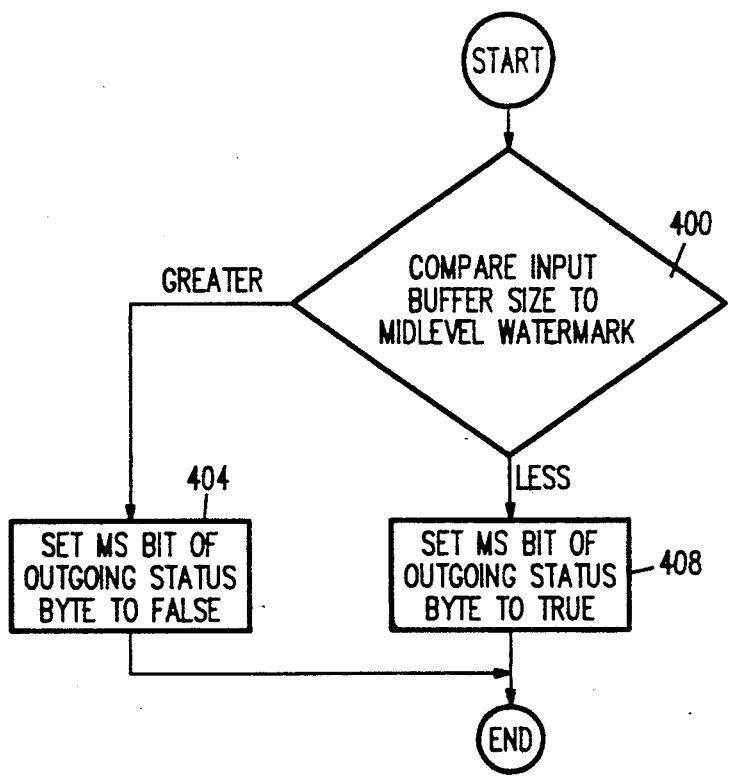
FIGS. 4A–4C illustrate data flow control for delivering clearinghouse data to the radio station of FIG. 1.

FIG. 4A is a flow chart of SCAG 140 programming for managing data flow from clearinghouse 110. The illustrated routine is executed as necessary, sampling the contents of FIFO buffer 142, i.e. prevent underflow and overflow. In block 400, SCAG 140 compares the current size, i.e., volume of message data, of FIFO buffer 142 to a midlevel watermark 402. SCAG 140 uses the most significant bit 406 of the SCAG status byte 310 to indicate to clearinghouse 110 the condition of FIFO buffer 142. Bit 406 is set true in block 408 to indicate "send more message data" when FIFO buffer 142 is low, and set false in block 404 to indicate "send less message data." Outgoing SCAG status bytes are queued in FIFO buffer 164 and there available for modification as described in blocks 404 and 408 to maintain data flow to FIFO buffer 142.

Figure 4B:
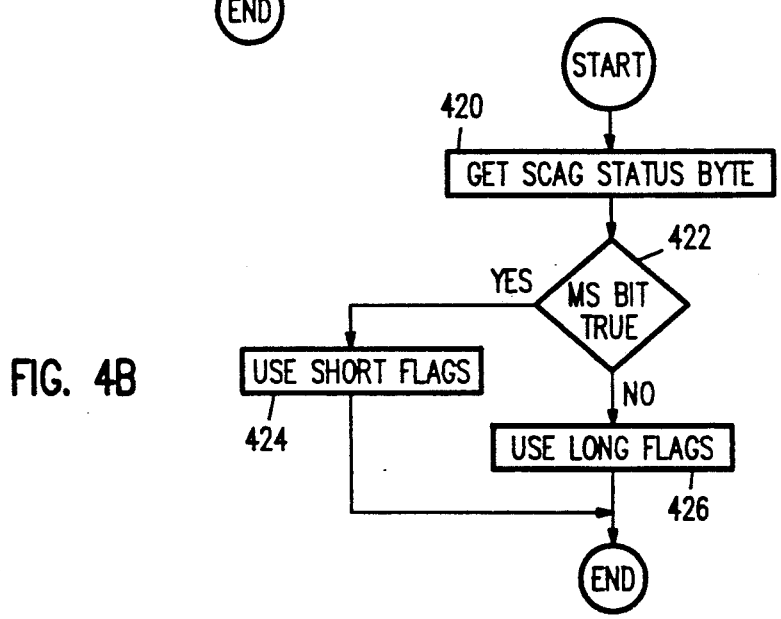

FIG. 4B is a flow chart of a fragment of a clearinghouse 110 program for processing SCAG status bytes 310 as received from radio station 114. In block 420, clearinghouse 110 extracts the incoming SCAG status byte 310. In decision block 422, clearinghouse 110 checks the state of bit 406 of SCAG status byte 310. If bit 406 is set true, clearinghouse 110 executes block 424 wherein subsequent transmission of packets 300 to radio station 114 includes short flags 302. The effective transfer rate of message data to radio station 114 is increased and an underflow condition for FIFO buffer 142 is avoided. If in block 422 bit 406 is false, clearinghouse 110 executes block 426 resulting in subsequent use of long flags 302. Less message data is sent and an overflow condition in FIFO buffer 142 is avoided.

Figure 4C:
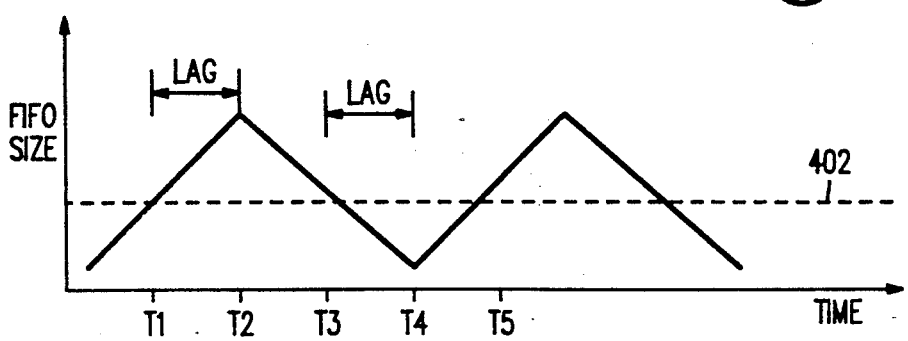

FIG. 4C plots the size, i.e., level of message data, in FIFO buffer 142 against time. At time T1 SCAG 140 detects the contents of FIFO buffer 142 as exceeding watermark 402 and instructs clearinghouse to send less message data, i.e. use long flags 302. During the following lag period T2–T1, the volume of data in FIFO buffer continues to grow until the time T2 when clearinghouse actually starts using long flags 302. The level of message data in FIFO buffer 142 then begins to reduce, the transmission rate of message data leaving radio station 114 being greater than the transfer rate to radio station 114. At time T3 SCAG 140 detects the level of message data in FIFO buffer 142 as falling below watermark 402 and instructs clearinghouse 110 to use short flags 302 to increase message data flow. At a later time T4, following a lag period T4–T3, clearinghouse 110 acts on these instructions and FIFO buffer 142 begins to fill with message data. The cycle repeats beginning at time T5 when SCAG 140 detects the size of FIFO buffer 142 as exceeding watermark 402.

Thus, management of data flow to radio station 114 is achieved by avoiding overflow and underflow of FIFO buffer 142. A similar use of long and short flags 308 is used to prevent underflow and overflow of buffer 164. It should be appreciated that this process maintains a continuous flow of SCAG command bytes 304 to radio station 114 and SCAG status bytes 310 from radio station 114. Thus, message data, commands, and status information are provided on a single full duplex communication channel, and data flow is managed without interrupting the flow of SCAG command bytes 304 and SCAG status bytes 310

Real time synchronization of packets 205 and 207 relative to the required time of transmission is accomplished by modifying the amount of padding data 212 relative to the base insertion rate of padding data 212. Thus, time synchronization is achieved by shifting the transmitted data to the appropriate transmission time, rather than attempting to gate and time stamp data at the time of transmission.

A feedback loop for time slot to UTC synchronization is established between radio station 11 and clearinghouse 110. Radio station 114 marks certain data packets 300 returned as verification data to clearinghouse 110 as transmission time data sample points. Clearinghouse 110 is able to calculate an actual time of transmission for the associated packets 205 and 207. The actual time of transmission, as calculated, is compared to the expected time of transmission. An average transmission timing error is established by processing a number of such data sample points. Clearinghouse 110 determines the amount of padding data 212 to be inserted in or removed from subsequent transmissions in order to correct the timing error. Subsequent instructions, i.e., SCAG command bytes 304, to radio station 114 implement the needed shift in packet 205 and 207 transmissions, and the timing error is corrected.

The indicia of time of transmission for packets 205 and 207 provided by radio station 114 is binary in character, not a time stamp, and corresponds to a known volume of data in the verification data path. The verification data path begins at the input to modulation detector 160, essentially the point of transmission, and ends at the BROADCAST SYNCHRONIZATION function 132, the point of access to real time reference 134. By marking a given datum of verification data at a time when the verification data path holds a known amount of data, its travel time along the verification data path is calculated by dividing the known amount of data by the transmission rate, i.e. TRATE. Knowing the travel time along the verification data path and the arrival time at the BROADCAST SYNCHRONIZATION function 132 allows calculation of an actual time of transmission.

The key variable in calculating a time of transmission is the amount of data held in the verification data path. The amount of data in the verification data path varies primarily as a function of the amount of data held in FIFO buffer 164 of radio station 114 and in VERIFICATION function 130 of clearinghouse 110. Clearinghouse 110 can determine directly the amount of data held by VERIFICATION function 130, but relies on radio station 114 to indicate a volume of data held in FIFO buffer 164. Thus, the size of FIFO buffer 164 governs when a given verification datum is marked by SCAG 140 as a transmission time data sample point.

Figure 5A:
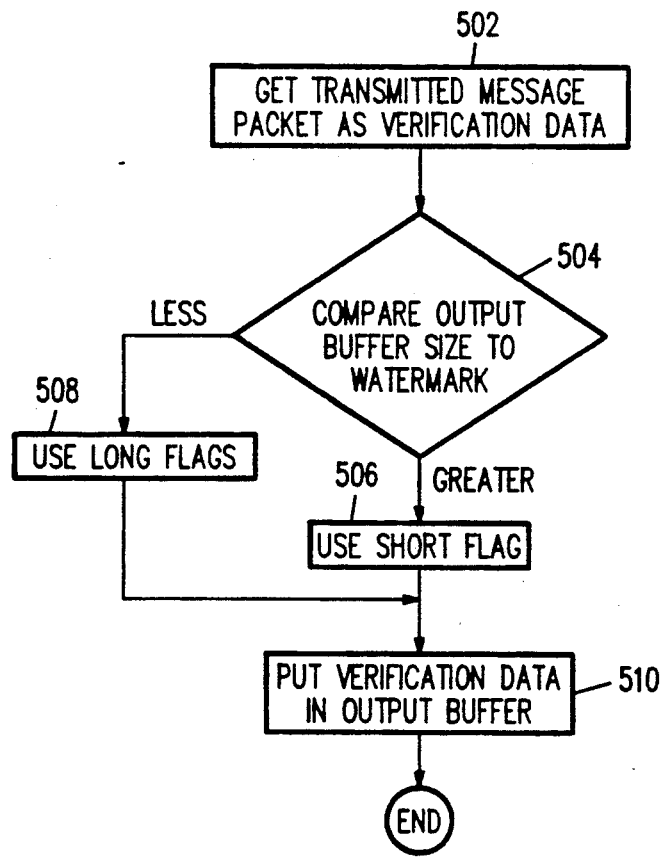
FIGS. 5A–5E illustrate real time synchronization of data transmissions from the radio station of FIG. 1.

FIG. 5A illustrates programming of SCAG 140 to provide to clearinghouse 110 an indication of data volume in FIFO buffer 164. The program segment of FIG. 5A is executed when SCAG 140 places a verification data packet 300 in FIFO buffer 164, and controls whether a long flag 308, i.e. two bytes, or a short flag 308, i.e. one byte, is used for that packet 300. In block 502 of FIG. 5A, SCAG 140 gets a packet 205 or 207 from DECODE function 162 and constructs a verification data packet 300 for placement in FIFO buffer 164. In decision block 504 SCAG 140 compares the size, i.e. amount of data, in FIFO buffer 164 to the watermark 500. If the size of FIFO buffer 164 is greater than watermark 500, then in block 506 SCAG 140 uses a short flag 308 for the verification data packet 300. If the size of FIFO buffer 164 is less than watermark 500, SCAG 140 uses a long flag 308 for the verification data packet 300. In block 510, SCAG 140 places the verification data packet in FIFO buffer 164.

The use of long and short flags 308 on the downlink 112b serves a dual purpose. By selectively using long and short flags 308 as a function of the size of buffer 164 relative to watermark 500, overflow and underflow of buffer 164 is avoided. Also, a transition from long to short, or short to long, flags 308 may be associated with a known volume of message data in buffer 164. By detecting, for example, a transition from long flags 308 to short flags 308 clearinghouse 110 identifies a packet 300 as being associated with a given level of data in buffer 164, the key variable in calculating an actual time of transmission for the associated packet 205 or 207.

Figure 5B:
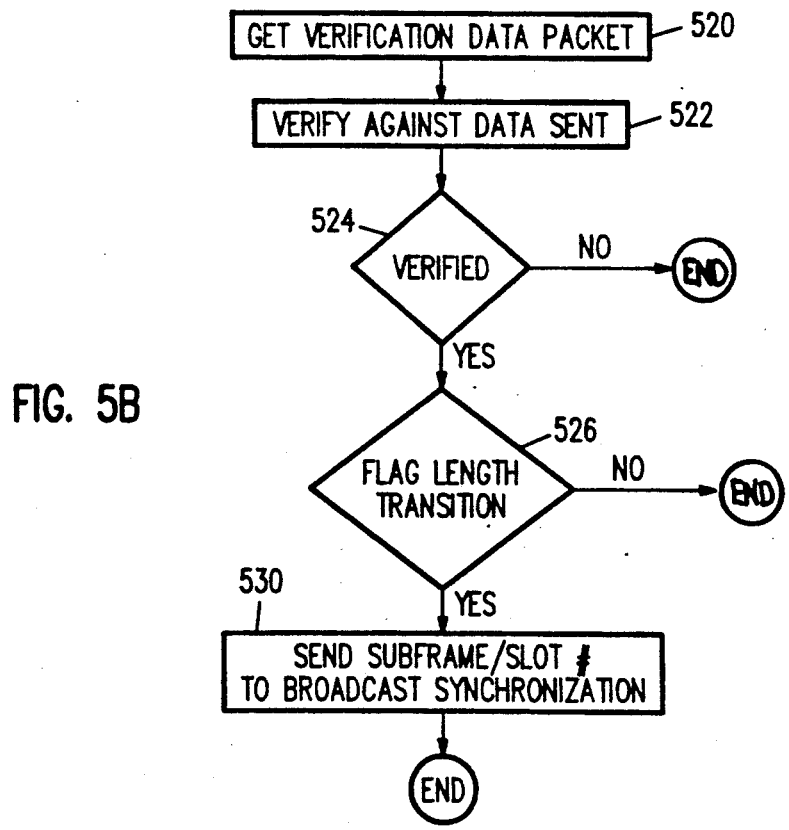

FIG. 5B illustrates VERIFICATION function 130 programming for detecting a transition from long flags 308 to short flags 308 or from short flags 308 to long flags 308, and therefore an opportunity to calculate a transmission time for a packet 207 or 205. In block 520 of FIG. 5B, VERIFICATION function 520 gets a verification data packet 300 by way of communication link 112. The verification data packet 300 is checked in block 522 against the corresponding data packet 300 previously sent to radio station 114. If the verification test fails, processing branches at decision block 524 to deal with the verification problem, but otherwise processing continues to decision block 526. In decision block 526 flag 308 length transitions are detected. If a long flag 308 to short flag 308 transition or short flag 308 to long flag 308 transition is detected, a packet 205 or 207 transmission time data sample point is indicated. In block 530 VERIFICATION function 130 sends to BROADCAST SYNCHRONIZATION function 132 the subframe and slot number of the associated packet 205 or 207. Thus, each subframe and slot number sent to BROADCAST SYNCHRONIZATION function 132 corresponds to a packet 205 or 207 for which an actual time of transmission may be calculated. Also, the subframe and slot number provides the expected time of transmission for that packet.

Figure 5C:
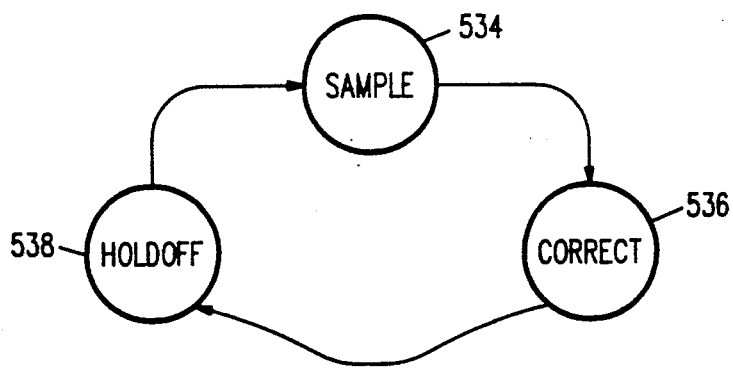

FIG. 5C illustrates the time synchronization process modes executed by clearinghouse 110. In a SAMPLE mode 534, BROADCAST SYNCHRONIZATION function 132 collects a given number of transmission time data sample points and calculates an average timing error expressed as the number of padding data 212 bits which must be added or subtracted relative to the base insertion rate. During a CORRECT mode 536, padding data 212 bits are added to or removed from subsequent transmissions as needed. During a HOLDOFF mode 538 no sampling or correction occurs, giving the system an opportunity to stabilize in preparation for the next SAMPLE mode 534. The cycle continues in feedback fashion to maintain real time synchronization of packets 205 and 207 transmissions.

Figure 5D:
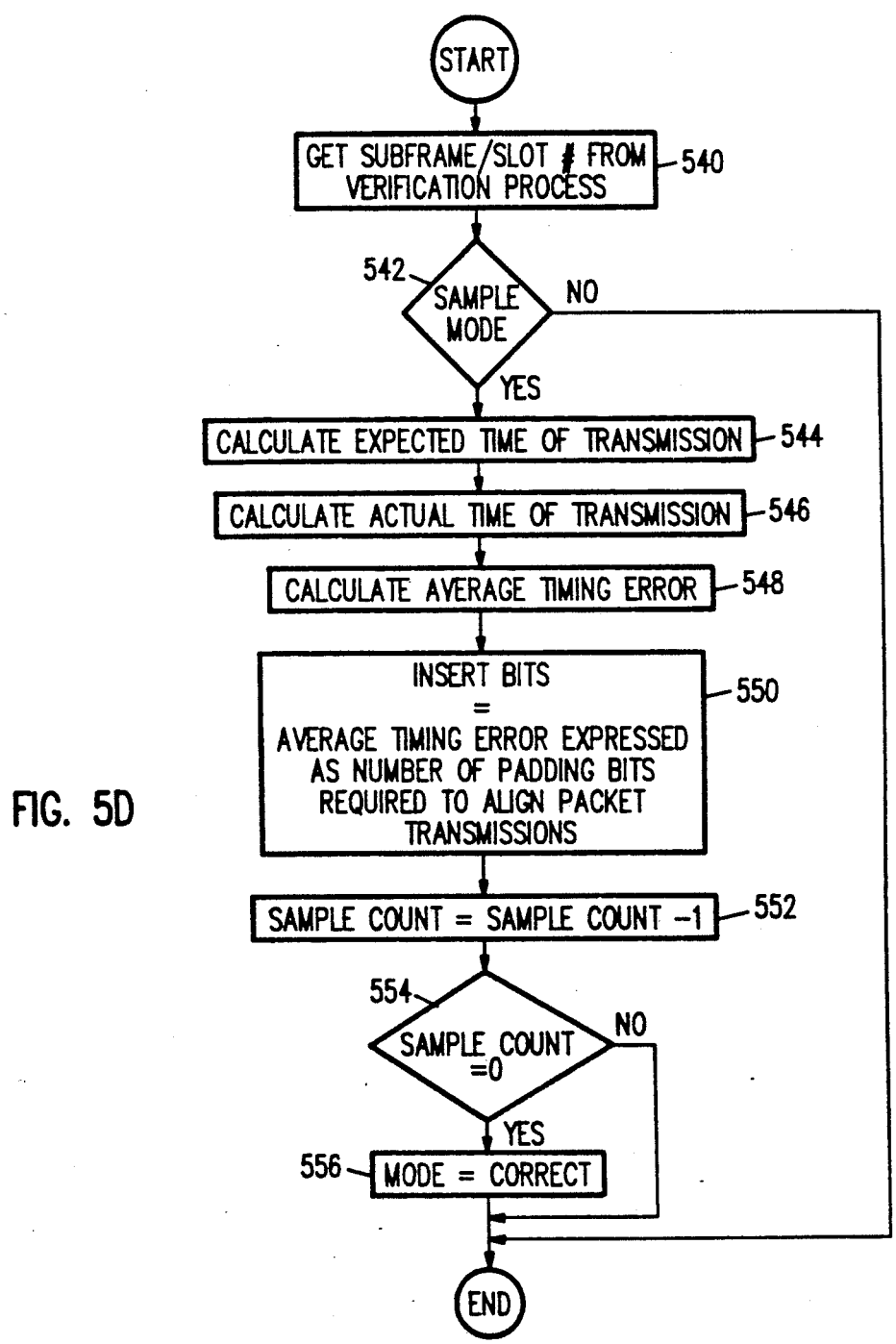

FIG. 5D illustrates SAMPLE mode 534 steps executed by BROADCAST SYNCHRONIZATION function 132 including calculation of an actual time of transmission for packets 205 and 207. In block 540, BROADCAST SYNCHRONIZATION function 132 receives a subframe and slot number from VERIFICATION function 130. In decision block 542, if clearinghouse 110 is not in SAMPLE mode 534, no further SAMPLE mode 534 steps are executed. When in sample MODE 534, however, BROADCAST SYNCHRONIZATION function 132 accepts the subframe and slot number as a data sample point for calculating a transmission timing error. In block 544, an expected time of transmission is calculated for the associated packets 205 and 207. Because the subframe and slot number identify a precise location within master time frame 200, the expected time of transmission corresponds to the subframe and slot number. Then in block 546, the actual time of transmission for the message packet 205 or 207 is calculated.

The basis for calculating an actual time of transmission is a known number of bits in the verification data path and the system transmission rate, TRATE. Accordingly, such a calculation will vary depending on implementation details. Generally, however, it is necessary to account for all bits in the verification data path.

In the illustrated embodiment, the total number of bits in the verification data path includes all bits held by radio station 114, communication link 112, and clearinghouse 110 prior to the detected transition from long flags 308 to short flags 308 or short flags 308 to long flags 308. The number of bits held by radio station 114 is substantially fixed when FIFO buffer 164 is at the watermark 500, as is the number of bits in transit along communication link 112. The number of bits held in VERIFICATION function 130 may be counted directly at clearinghouse 110. To account for verification data bits held in a USART 130a of clearinghouse 110, however, a timer 180 is used. VERIFICATION function 130 retrieves data from communication link 112 by way of USART 130a, and for each access of USART 130a, timer 180 is reset to zero by VERIFICATION function 130. Timer 180 is clocked at a rate corresponding to data transfer on communication link 112. Accordingly, the value held in timer 180 corresponds to a number of bits held by USART 130a, i.e., not yet taken by VERIFICATION function 130. In this particular embodiment, dividing by three the value held by timer 180 yields the number of bits held in USART 130a.

The total number of bits in a first portion of verification data path, hereafter VBITS1, and in a remaining portion, VBITS2, is calculated as:

$$VBITS1 = C1$$

$$VBITS2 = C2 + V1 + (TIMER/3)$$

where C1 is a constant corresponding to the number of bits held in modulation monitor 160 and DECODE function 162; C2 is a constant corresponding to the number of bits held in FIFO buffer 164 and communication link 112 at a time when the volume of FIFO buffer 164 equals watermark 500; V1 is a variable storing the number of bits held in VERIFICATION function 130 and preceding the flag 308 transition point; and the term (TIMER/3) corresponds to the number of bits held in USART 130a.

The actual time of transmission is then calculated as:

$$UTC\ REFERENCE - (VBITS1 + VBITS2)/TRATE$$

Having established an expected time of transmission and an actual time of transmission, a transmission timing error for a packet 205 or 207 is calculated as the difference. BROADCAST SYNCHRONIZATION function 132 then incorporates in block 548 this single packet timing error into an average timing error over the current SAMPLE mode 534. Calculating an average timing error is important as some jitter in the system cannot be avoided. Fortunately, jitter affecting timing error calculations has been found to be well distributed and suitably filtered by maintaining an average timing error based on a number of time of transmission data sample points.

Continuing to block 548, the average timing error is converted into a number of bits required to correct the timing error where each bit corresponds to its transmission time, the inverse (1/TRATE) of the system transmission rate. This value, held in a numeric variable INSERT BITS, may be positive or negative depending on the direction of data shift required to correct the timing error. Thus, a positive value for INSERT BITS indicates early transmission of packets 205 and 207 and a negative value indicates late transmission. By inserting relatively more padding data 212, as indicated by a positive INSERT BITS value, transmission of subsequent packets 205 and 207 is delayed. Similarly, inserting less padding data 212 advances transmission time for subsequent packets 205 and 207.

In block 552 a SAMPLE COUNT variable is decremented to account for processing of a transmission time data sample point, the variable SAMPLE COUNT having been previously initialized to the number of data samples to be taken. In decision block 554, the SAMPLE COUNT variable is compared to zero as a terminal condition to SAMPLE mode 534. If SAMPLE COUNT has not reached zero, SAMPLE mode 534 processing relative to the current transmission time data sample point concludes. If, however, SAMPLE COUNT has reached zero, indicating the end of the current SAMPLE mode 534, processing passes through block 556 where the clearinghouse 110 mode is set to CORRECT mode 536.

Thus, BROADCAST SYNCHRONIZATION function 132 accepts a number of transmission time data sample points and maintains the variable INSERT BITS expressed as a number of padding data 212 bits required to correct a detected timing error. This adjustment, whether positive or negative, is applied to the base insertion rate of padding data 212 otherwise used to fill the master time frame to the required fifteen minutes.

Figure 5E:
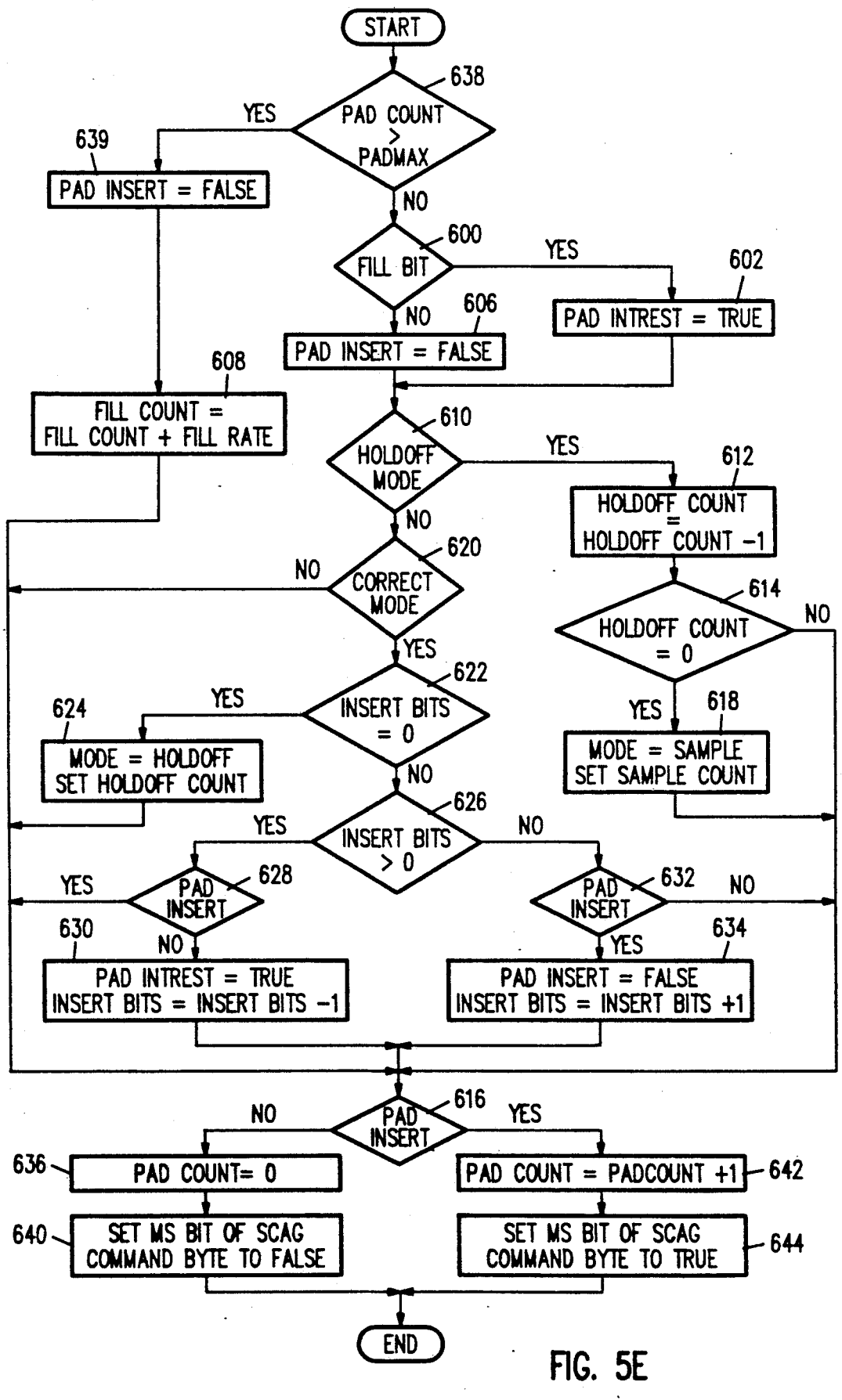

FIG. 5E illustrates BROADCAST SYNCHRONIZATION steps associated with transfer of each packet 300 to radio station 114, and whether or not clearinghouse 110 instructs radio station 114 to insert, or not to insert, one bit of padding data 212 in association with the associated packets 205 or 207. The procedures of FIG. 5E determine, therefore, the value of bit 305 of each SCAG command byte 304. Generally, BROADCAST SYNCHRONIZATION function 132 first determines whether a padding data 212 bit is needed as a "fill bit" to satisfy the base insertion rate used to fill the master time frame 200 to a full fifteen minute interval. Then, as a function of detected timing errors, padding data 212 bits are added or subtracted relative to the base insertion rate. Several padding data 212 insertion rules are implemented in these procedures. First, only a limited number of padding data 212 bits, expressed as PADMAX in FIG. 5E, are inserted between consecutive packets 205 and 207. Second, only one padding data 212 bit is inserted between any two packets. Accordingly, a padding data 212 "correction bit" may not be inserted where one has been already placed, e.g., as a fill bit, nor can a padding data 212 bit be removed where no fill bit has been placed.

The first step is to look at how many consecutive padding data 212 bits, as indicated by the variable PAD COUNT, have been inserted. The variable PAD COUNT is compared in block 638 to PADMAX, the maximum number of consecutive padding data 212 bits allowed. If PAD COUNT exceeds PADMAX, the variable PAD INSERT is set to false in block 639. Then in block 608, the global variable FILL COUNT is incremented by the value of FILL RATE to account for a transmitted packet in the algorithm of FILL_BIT, discussed above. Processing then advances to block 616. If in block 638 PAD COUNT does not exceed PADMAX, processing branches to decision block 600.

In decision block 600, the procedure FILL_BIT, discussed above, is invoked to determine whether a padding data 212 fill bit is to be placed in accordance with the base insertion rate. When the procedure FILL_BIT returns true, processing branches to block 602 where the variable PAD INSERT is set to true indicating that a padding data 212 bit is to be inserted. If, in block 600, the FILL_BIT returns false, then in block 606 the variable PAD INSERT is set to false, indicating do not insert a padding data 212 bit.

Continuing to decision block 610, if the current mode is HOLDOFF mode 538, the processing branches to block 612 where the variable HOLDOFF COUNT is decremented. Then in block 614 the variable HOLDOFF COUNT is compared to zero, the terminal condition for HOLDOFF mode 538. If HOLDOFF COUNT has not reached zero processing advances to decision block 616. Eventually, however, HOLDOFF COUNT reaches zero to conclude HOLDOFF mode 538 and processing passes from block 614 to block 618 where the current mode is set to SAMPLE mode 534 and the SAMPLE COUNT variable is suitably initialize to determine the number of data samples taken during the next SAMPLE mode 534 as described in conjunction with FIG. 5D.

If at decision block 610 the current mode is not HOLDOFF mode 538, processing advances to decision block 620 which tests for CORRECT mode 536. If the system is not in CORRECT mode 536, processing advances to decision block 616. When in CORRECT mode 536, however, processing branches to decision block 622 which compares the current value of INSERT BITS to zero as a terminal condition for CORRECT mode 536. If INSERT BITS has reached zero, then the system mode is set in block 624 to HOLDOFF mode 538, the variable HOLDOFF COUNT is initialized to control the duration of the next HOLDOFF mode 538, and processing advances to decision block 616.

If INSERT BITS does not equal zero, some padding data 212 fill bits must be removed, for a negative value of INSERT BITS, or additional padding data 212 bits must be inserted as correction bits. In either case, processing branches to decision block 626 where the sign of INSERT BITS is established. If INSERT BITS is positive, meaning additional padding data 212 bits must be inserted, processing branches to decision block 628 where the variable PAD INSERT is tested. If PAD INSERT is true, indicating a prior decision place a padding data 212 fill bit, a padding data 212 bit cannot be placed because only one padding data 212 bit may be inserted for each packet 205 or 207. In such case processing skips to decision block 616. If in block 628 PAD INSERT is false, indicating that a padding data 212 bit may be placed, execution of block 630 sets PAD INSERT to true and INSERT BITS is decremented to account for placement of a padding data 212 correcting bit. Processing then continues with decision block 616. If in block 626 INSERT BITS is found to be negative, indicating that padding data 212 fill bits must be removed, decision block 632 tests the value of PAD INSERT. If PAD INSERT is false, there is no padding data 212 fill bit to remove and processing continues to decision block 616. If PAD insert is true, however, execution of block 634 sets PAD INSERT to false and increments the variable PAD INSERT to account for removal of a padding data 212 fill bit.

At decision block 616 the variable PAD INSERT indicates whether a padding data 212 bit is to be inserted, whether as a fill bit or a correcting bit. If PAD INSERT is true, execution of block 642 increments the variable PAD COUNT to reflect insertion of a padding data 212 bit. In block 644, bit 305 of the associated SCAG command byte 304 is set to true. If in block 616 PAD INSERT is false, no padding data 212 bit is to be inserted. Block 636 then resets the variable PAD COUNT to zero and block 640 sets bit 305 to false. As previously described, radio station 114 reacts to bit 305 of each SCAG command byte by inserting or not inserting a padding data 212 bit adjacent the associated packet 205 or 207.

In overall operation, clearinghouse 110 begins, for example, by sending data to radio station 114 such that subframe 202 data suitably coincides with the proper subframe 202 boundary in real time. The delay from clearinghouse 110 to actual radio signal transmission is substantially fixed such that the initial data sent to radio station 114 precedes its expected time of transmission by this known offset. Ideally, the 19,000 transmission rate of radio station 114 remains fixed and, as long a FIFO buffer 142 holds data and the initial transmission was properly synchronized with real time, each packet 205 and 207 would be transmitted during its associated time slot 206. Unfortunately, the time reference 147 which governs the radio station 114 data transmission rate is not absolutely fixed and slight variation occurs. As the reference 147 varies, so does the time of transmission for packets 205 and 207. The described method of radio signal synchronization accommodates such variation in reference 147.

As the system iterates between SAMPLE mode 534, CORRECT mode 536 and HOLDOFF mode 538 data transmissions are maintained in alignment with their associated time slots and system timing protocol is achieved. In accordance with this method, the time of transmission for a given packet is adjusted by increasing or decreasing padding data 212 to shift the position of the packet in the transmitted data stream. If the reference 147 of the radio station 114 drifts slightly relative to real time reference 134, the system maintains its time critical packet transmissions by adjusting transmission of subsequent packets. Receivers 116 have a stable time reference by way of packets 205 transmitted during control slot C0, and the subframe and slot numbers of message data packets 207. Each receiver 116 can use this information to synchronize to the system to recover its paging message information.

The illustrated paging system, as disclosed in U.S. Pat. Nos. 4,713,808 and 4,897,835, incorporated herein above by reference, may be adapted to broadcast identical paging information from different radio stations 114. The master time frames 200 for each radio station 114 are offset in time by predetermined station offsets. A receiver 116 can, for example, upon missing a data packet 207 immediately switch to a radio station 114 transmitting the same packet 207 at a later time and target the same data packet 207 knowing the radio station 114 offsets.

Figure 6:
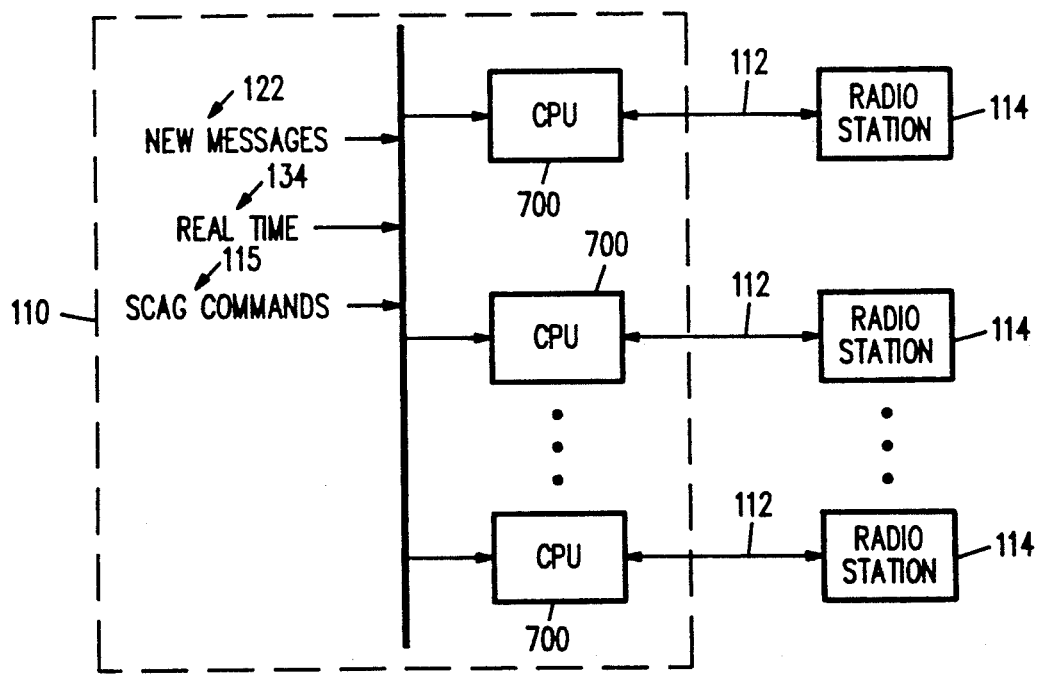
FIG. 6 illustrates application of the present invention to a paging system using multiple radio stations transmitting similar data but offset in time.

FIG. 6 illustrates application of the present invention to a paging system using multiple radio stations 114 transmitting offset master time frames 200. In FIG. 6, radio stations 114 each operate a described above. Clearing house 110 is modified to illustrate that QUEUER function 124, SUBFRAME CONSTRUCTION function 126, PROTOCOL ENCODING function 128, VERIFICATION function 130, and BROADCAST SYNCHRONIZATION 132, timer 180, and USART 130a may be implemented on single board computers 700 each coupled to a corresponding radio station 114 by a separate communication link 112. Each computer 700, responsible for clearinghouse 110 interaction with one of radio stations 114, receives from a common clearinghouse 110 source the new messages 122, SCAG commands 115, and real time reference 134.

Real time synchronization of transmitted packets 205 and 207 of the multiple radio station 114 system is accomplished as described above with the exception of the step of calculating an expected time of transmission shown block 544 of FIG. 5D. The expected time of transmission is as described, i.e. directly related to the slot and subframe number identifying position within master time frame 200, but must account for the associated radio station 114 offset.

As discussed above, the actual system transmission rate TRATE may be entered as a parameter to the time synchronization process. In the illustrated system, TRATE can vary between 19,002 bps and 18,998 bps. Knowing the precise frequency of time reference 147 improves time synchronization because the FILL RATE may be more accurately calculated. The actual frequency of reference 147 does, however, vary during operation and such variations are accounted for as described in the process of time synchronization. When variations in reference 147 are short term variations the value of INSERT BITS varies inconsistently over time. If the value of INSERT BITS is consistent over a given number of SAMPLE modes 534, however, a long term timing error is indicated.

Figure 7:
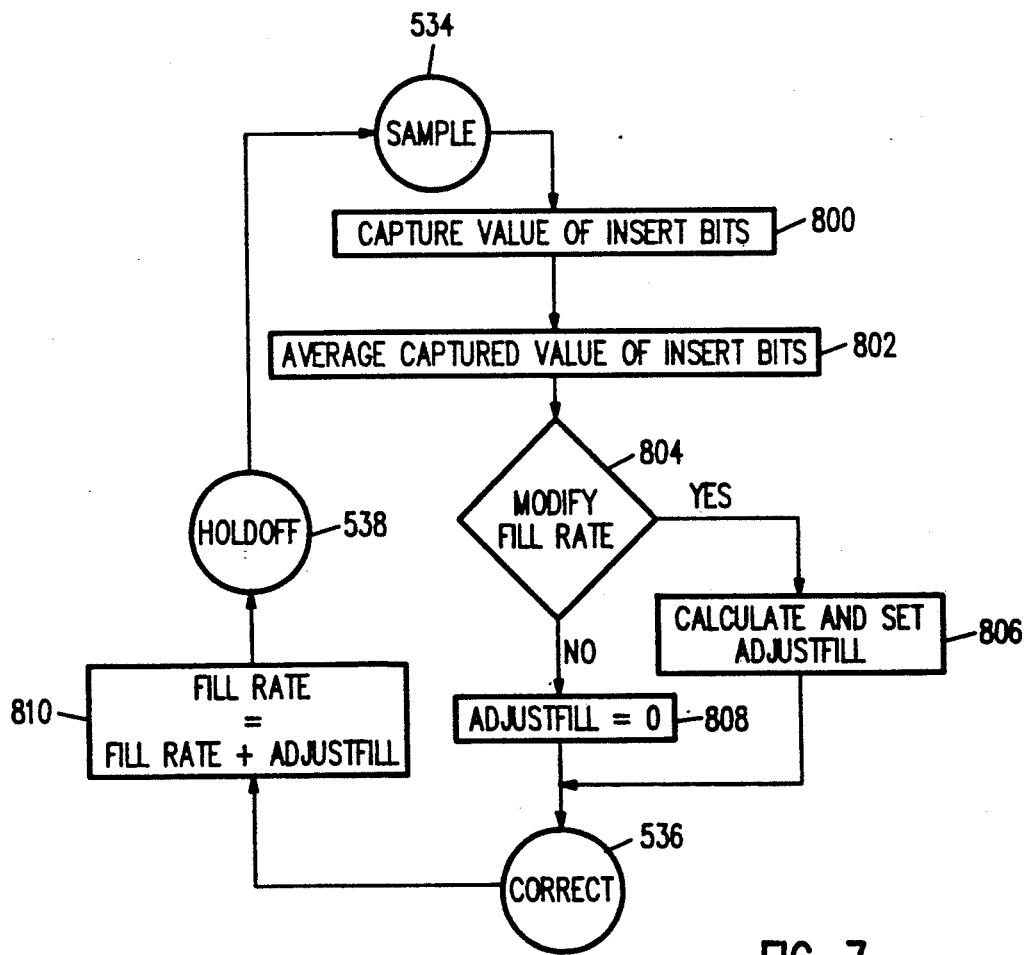
FIG. 7 illustrates a method of adjusting transmission time synchronization based on consistency of long term timing errors.

FIG. 7 illustrates detection of a long term timing error and correction by adjustment of the FILL RATE, rather than imposing correction of the long term error on the time synchronization process. In FIG. 7, as the system moves from SAMPLE mode 534 to CORRECT mode 536, an intermediate step 800 detects the current timing error by capturing the current value of INSERT BITS. A long term timing error LERROR is calculated in step 802 as the average of previously captured values of INSERT BITS. In step 804, the value of LERROR is examined and used as a basis for detecting a long term timing error more suitably corrected by modifying the value of FILL RATE. For example, given a sufficient number INSERT BITS values incorporated into LERROR, if LERROR holds a value of sufficient magnitude, modification of the value of FILL RATE is warranted. If FILL RATE is to be modified, a global variable ADJUSTFILL is set in block 806 to a value expressed in terms similar to FILL RATE, i.e. a number of padding data 212 fill bits per packet 205 or 207 as discussed above, as needed to correct the detected long term error. Otherwise, ADJUSTFILL is set in block 808 to zero.

Following the subsequent CORRECT mode 536, execution of block 810 adds the value of ADJUSTFILL to the variable FILL RATE, whether positive, negative or zero, to modify FILL RATE in accordance with any detected long term timing error.

Thus, an improved method of real time synchronization of transmitted data has been shown and described. Having described and illustrated the principles of the invention and a preferred embodiment thereof, it will be apparent to those skilled in the art that the invention may be modified in arrangement and detail without departing from such principles.

We claim:

1. A method of transmitting time of day information by radio signal, the method comprising:
    providing a transmission sequence of data packets to be transmitted at a predetermined transmission rate, said data packets including time packets carrying time of day information corresponding to an expected time of transmission, said transmission sequence including padding data selectably inserted between the data packets;
    transmitting said transmission sequence of data packets substantially at said predetermined transmission rate:
    detecting a time of transmission for ones of said data packets;
    comparing detected times of transmission with expected times of transmission for said data packets to calculate a timing error representing a difference between time of day information carried in a given time packet and a calculated time of transmission for the given time packet; and
    modifying the amount of padding data within said transmission sequence based on said timing error to cause transmission of subsequent time packets substantially at a time corresponding to the time of day information carried therein.

2. The method according to claim 1 wherein said modifying step includes providing more padding data to delay transmission of subsequent data packets in response to a detected timing error indicating early transmission of data packets and providing less padding data to advance transmission time of subsequent data packets in response to a detected timing error indicating late transmission of data packets.

3. A method of adjusting a time of radio signal transmission for data packets in a synchronous communication protocol, the method comprising:
    ordering the data packets in a transmission sequence corresponding to an associated predetermined time of transmission for each packet in accordance with the synchronous communication protocol;
    selectably inserting padding data between selected data packets in said transmission sequence;
    transmitting said transmission sequence of data packets including said padding data;
    determining a time of transmission for ones of said data packets;
    comparing the time of transmission for said ones of said data packets to establish a transmission timing error; and
    adjusting time of transmission for subsequent data packets as a function of said transmission timing error by modifying the amount of padding data inserted into said transmission sequence.

4. A method of indicating a time of radio signal transmission for communication data, the method comprising:
    coupling a communication data generating process and a communication data transmitting process by means of a bi-directional communication link;
    providing said communication data on a first leg of said bi-directional communication link from said data generating process to said data transmitting process;
    modulating at said data transmission process the communication data received on said first leg at a predetermined transmission rate to produce a modulated signal for radio signal transmission;

extracting as verification data said communication data from said modulated signal for radio signal transmission;

providing said verification data on a second leg of said bi-directional communication link to said data generating process, said second leg having a first portion carrying a variable volume of said verification data and a second portion operating at a predetermined data rate;

providing within said verification data indicia of time of transmission for selected portions of communication data within said verification data, said indicia of time of transmission indicating when said first portion of said second leg carries a predetermined volume of said verification data.

5. The method according to claim 4 wherein a time of transmission for a given portion of said communication data is calculated by reference to said predetermined data rate, said predetermined volume, and a time of receiving at said data generating process said indicia of time of transmission.

6. The method according to claim 5 wherein said communication data is transmitted in accordance with a synchronous transmission protocol wherein each portion of said communication data is to be transmitted at an associated predetermined time, and said method further comprises:

comparing said calculated time of transmission for said given portion of said communication data with said associated predetermined time of transmission; and inserting padding data within said communication data to adjust a time of transmission for subsequent portions of said communication data, the volume of said inserted padding data being a function of said comparing step.

7. A method of transmitting communication data by radio signal in accordance with a synchronous communication protocol requiring transmission of data packets at associated predetermined times, the method comprising:

collecting the communication data as said data packets in a transmission sequence corresponding to the associated predetermined times for said data packets;

selectably inserting padding bits between said data packets in said transmission sequence;

modulating said data packets including said inserted padding bits on a carrier signal to provide a modulated carrier signal adapted for radio signal transmission;

delivering the modulated carrier signal by an antenna communication link to a radio signal transmission antenna for radio signal transmission of said modulated carrier signal; and monitoring said antenna communication link to extract said data packets as verification data, said verification data further including indicia of time of transmission with respect to a given one of said extracted data packets, whereby selection of padding bits for insertion within said transmission data sequence is a function of timing errors detected by comparison of said indicia of time of transmission relative to the associated predetermined time of transmission for said given data packet.

8. The method according to claim 7 wherein said verification data is delivered on a verification communication link operating at a predetermined rate and carrying a varying volume of said verification data whereby said indicia of time of transmission marks said given data packet in association with said verification communication link containing a predetermined volume of data.

9. The method according to claim 8 wherein said verification communication link includes a buffer containing a variable volume of said verification data and the remaining portions of said verification communication link carry a known volume of said verification data and said predetermined volume of verification data is detected by a predetermined volume of verification data within said buffer.

10. The method according to claim 7 wherein said method further comprises:

delivering said verification data on a verification communication link operating at a predetermined rate and carrying a varying volume of said verification data;

providing said indicia of time of transmission in association with said given data packet when said verification communication link contains a known volume of data; and establishing a time of arrival for said binary variable of said predetermined value at a terminal portion of said verification communication link.

11. The method according to claim 7 wherein the number and distribution of said padding data inserted within said transmission sequence as a function of said detected timing errors is such to maintain time of transmission for said data packets at associated predetermined times of transmission.

12. The method according to claim 11 wherein the amount of padding data inserted within said transmission sequence is increased when a detected timing error indicates that said given data packet is transmitted earlier than its associated predetermined time of transmission.

13. The method according to claim 11 wherein the amount of padding data inserted within said transmission sequence is decreased when a detected timing error indicates that said given data packet is transmitted later than its associated predetermined time of transmission.

14. The method according to claim 7 including consecutive periods of sampling to establish an average timing error, periods of correction for inserting padding data to correct the timing error, and periods of holdoff wherein no sampling or correction occurs.

15. In a synchronous communication protocol requiring transmission of data packets at predetermined times relative to a time reference and within a given margin of timing error, selected ones of said data packets being separable by padding bits, a method of maintaining transmission synchronization comprising:

constructing at a data generating installation the data packets and ordering the data packets in accordance with a transmission sequence;

providing the ordered data packets to a transmission installation;

transmitting the ordered data packets from the transmission installation;

providing to said data generating installation as verification data the ordered data packets as transmitted, said verification data being marked in accordance with a time of transmission;

receiving said verification data at said data generating installation, detecting marked verification data, and comparing a time of transmission indicated by said marked verification data with an expected time of transmission for said marked verification data to detect a transmission timing error; and upon detecting a transmission timing error, inserting additional padding bits between selected ones of said data packets in said ordered data packets or removing selected ones of said padding bits between selected ones of said data packets in said ordered data in accordance with said detected timing error to maintain data transmission within said margin of error.

16. The method according to claim 15 wherein said step of marking verification data comprises the steps:

monitoring a volume of data in a return data path operating at a predetermined return path data rate, said return data path providing said verification data to said data generating installation; and marking verification data when said return path data volume equals a known volume, whereby said data generating installation determines a time of transmission by detecting the marked verification data, referencing said predetermined return path volume, and referencing said predetermined return path data rate.

* * * * *